Sept. 15, 1925.
A. C. GARRECHT
1,553,312
UNIVERSAL JOINT
Filed April 27, 1922
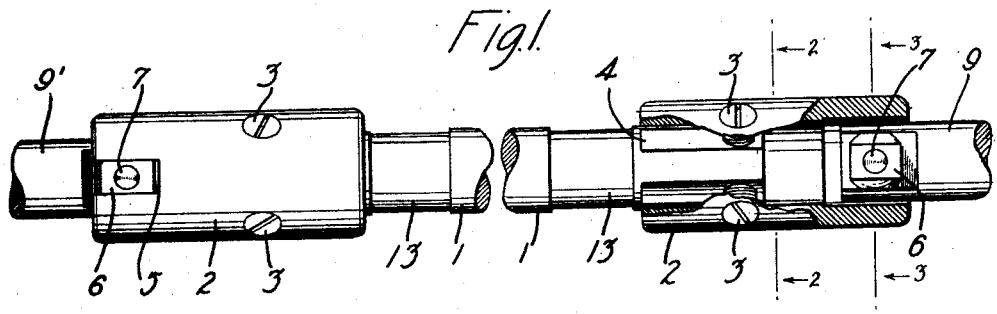
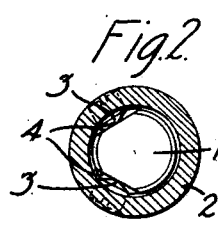 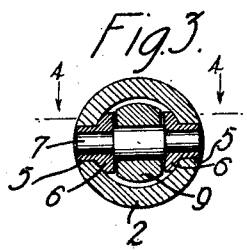 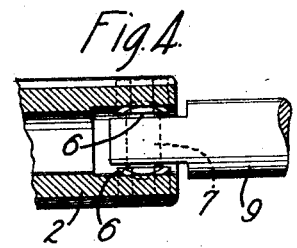
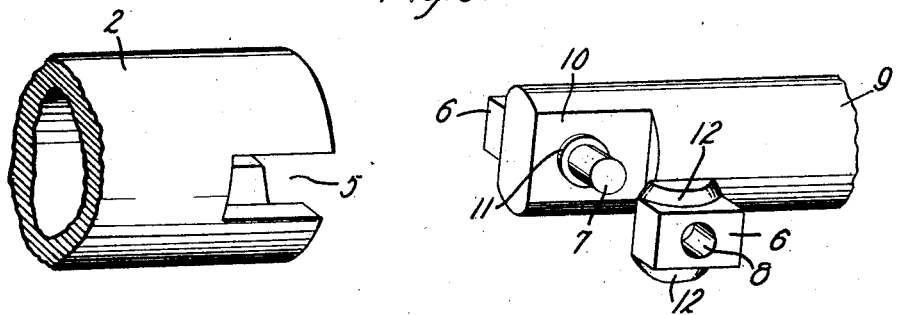
Inventor:
Arthur C. Garrecht,
by W. E. Beatty, Atty.

Patented Sept. 15, 1925.

1,553,312

UNITED STATES PATENT OFFICE.

ARTHUR C. GARRECHT, OF SOUTH BOUNDBROOK, NEW JERSEY, ASSIGNOR TO WESTERN ELECTRIC COMPANY, INCORPORATED, OF NEW YORK, N. Y., A CORPORATION OF NEW YORK.

UNIVERSAL JOINT.

Application filed April 27, 1922. Serial No. 557,014.

*To all whom it may concern:*

Be it known that I, ARTHUR C. GARRECHT, a citizen of the United States, residing at South Boundbrook, in the county of Somerset, State of New Jersey, have invented certain new and useful Improvements in Universal Joints, of which the following is a full, clear, concise, and exact description.

This invention relates to improvements in universal joints and more particularly to couplings which are adapted to effect the proper functioning of misaligned shafts.

The object of this invention is to produce a cheap and reliable coupling, the integral parts of which are interchangeable and readily replaced, and by virtue of the use of which the operation of two misaligned shafts may be effected.

The invention, which is particularly adapted to couple associated drives used in machine switching systems and which provides for a substantially stable assembly, consists essentially of a length of shaft with a coupling sleeve mounted on each end and secured thereto by means of set screws. The ends of the shaft are provided with flats of suitable lengths to allow for setting the sleeves in correct position, as required by the units to be connected. The coupling sleeve is provided with diametrically opposed slots to accommodate a set of sliding blocks which are partially spherical in shape. Cylindrical apertures in the blocks accommodate the tip of a shouldered pin, the main portion of which passes through one of the drives to be coupled. By means of the sliding blocks and their spherical bearing surfaces, a drive that is coupled to a sleeve has freedom of motion in one plane, whereas the cylindrical body of the pin associated with the blocks allows motion in a plane perpendicular to the first said plane, so that the combination of the two will produce the same effect as the well known universal joint.

In the accompanying drawing, which illustrates this invention, Fig. 1 is a view, partly in section, of the assembled coupling. Fig. 2 is a transverse section along the line 2—2 of Fig. 1. Fig. 3 is a transverse section along the line 3—3 of Fig. 1. Fig. 4 shows in part a sectional view of a coupling sleeve with a section of a drive coupled thereto. Fig. 5 is a perspective of the coupling with its integral parts in position for assembly.

Similar figures refer to similar parts throughout the several views.

Coupling sleeves 2—2 are shown mounted on a length of shaft 1 and held in position by set screws 3. The shaft 1 is provided with a series of flats 4 on each end to provide means for regulating the position of the sleeves 2 thereon and to provide bearing surfaces for the retaining screws 3. Diametrically opposed slots 5 are located on one end of each sleeve 2 and are adapted to accommodate the rectangular shouldered portions of sliding blocks 6. A cylindrical aperture 8 is centrally located in block 6 to accommodate the extending portion of pin 7. The pin 7 is so constructed as to be of smaller diameter at each end than at the central portion thereof. A drive 9 to be coupled is provided with flat bearing surfaces 10 with which one side of block 6 makes contact when the coupling is effected. A cylindrical hole 11, located on one end of the drive 9, receives the main body portion of pin 7, which permits relative rotation of shaft 9 about the pin 7. Block 6 is provided with shouldered portions 12 having convex bearing surfaces. When assembled, these shouldered portions bear on the inner surface of sleeve 2 and permit relative movement of shaft 9 in a plane parallel to the axis of pin 7.

The following description of how the coupling is assembled will give a clear understanding of the invention and will point out the relative positions of the respective parts and functions thereof.

Assuming drives 9 and 9' are to be coupled, the pin 7 is inserted in the cylindrical hole 11 located at the end of drive 9, as shown in Fig. 5. Sliding blocks 6 are placed on pin 7, the ends of said pin extending into the cylindrical holes 8 of blocks 6. The sleeve 2 is now slipped over the end of shaft 9, the sides of slots 5 making sliding contact with the surfaces of the shouldered portions of blocks 6. The same series of operations is enacted with reference to shaft 9'. Set screws 3 are loosened and the sleeves 2 are positioned on the shaft 1 according to the distance between drives 9 and 9', and when properly located, the screws are tightened and the drives are then in operating position. Shaft 1 is provided with undercuts or clearances 13 which permit the sleeves 2 to be moved back on shaft 1 thereby permitting the removal of the coupling without disturbing the positions of drives 9 and 9'.

It is to be noted that the parts which complete this coupling are interchangeable and reversible. The blocks 6 may be positioned in either sleeve and in either slot thereof without affecting the operation of the device, whereas the pins 7 may be inserted in any drive to be coupled, and will function properly with either of the sleeves 2, while the sleeves 2 will operate effectively on either end of shaft 1.

What is claimed is:

1. In a coupling, driving and driven members, a coupling sleeve removably mounted on one of said members, said sleeve provided with a set of lateral guides, and blocks movably mounted on one end of the other member adapted to engage the guides and the interior surface of the sleeve for connecting said driving and driven members to allow a universal movement of said driven member relative to said driving member.

2. In a coupling, driving and driven members, a cylindrical sleeve provided with slots and mounted on one of said members, means to adjust the position of said sleeve on said member, a pin mounted in a hole in the other member and projecting from both ends of said hole, and means movably mounted on the projecting portions of said pin and engaging the slots and the interior surface of said sleeve to permit a universal movement of said driven member relative to said driving member.

3. In a coupling, driving and driven members, a sleeve therefor provided with a series of slots, projections from one of said members, and a block removably mounted on each of said projections, said blocks being interchangeable and adapted to engage the slots and the interior surface of said sleeve.

4. In a coupling, driving and driven members, a sleeve removably mounted on said driven member and provided with diametrically opposed lateral slots, a cylindrical pin passing through the end of said driven member and projecting therefrom, and means mounted on the projecting ends of said pin comprising rectangular and convex bearing surfaces, the first of said surfaces engaging the sides of said slots and the other of said surfaces engaging the inner surface of said sleeve.

5. A universal joint comprising a cylindrical sleeve provided with elongated slots, a drive to be coupled thereto, and a plurality of interchangeable members rotatably mounted on said drive and engaging the slots and the interior surface of said sleeve.

6. A universal joint comprising a coupling member having bearing surfaces comprising parallel flat surfaces and surfaces of revolution, the latter surfaces having their axes substantially at right angles to each other, and a second coupling member adapted to engage both kinds of surfaces on said first coupling member.

7. A coupling comprising a shaft, a sleeve mounted at each end of said shaft, said sleeves provided with slots, rotatable drives having blocks mounted thereon, the blocks on each drive engaging the slots and the interior surface of a sleeve to form a universal joint, and means for coupling said sleeves to said shaft so that said shaft and sleeves may be disassociated from said drives and each other without disturbing the relative positions of the drive.

In witness whereof, I hereunto subscribe my name this 21st day of April A. D., 1922.

ARTHUR C. GARRECHT.